United States Patent
Menouar

(10) Patent No.: US 9,888,357 B2
(45) Date of Patent: Feb. 6, 2018

(54) METHODS AND SYSTEMS FOR IDENTIFYING THE USER OF A SMARTPHONE INSIDE A MOVING VEHICLE AND AUTOMATIC DETECTION AND CALCULATION OF THE TIME AND LOCATION WHEN AND WHERE A VEHICLE HAS BEEN PARKED

(71) Applicant: QATAR UNIVERSITY QSTP-B, Doha (QA)

(72) Inventor: Hamid Menouar, Doha (QA)

(73) Assignee: QATAR UNIVERSITY QSTP-B, Doha (QA)

( * ) Notice: Subject to any disclaimer, the term of this patent is extended or adjusted under 35 U.S.C. 154(b) by 0 days.

(21) Appl. No.: 15/168,161

(22) Filed: May 30, 2016

(65) Prior Publication Data
US 2017/0347238 A1    Nov. 30, 2017

(51) Int. Cl.
| | | |
|---|---|---|
| H04W 24/00 | (2009.01) | |
| H04W 4/02 | (2009.01) | |
| H04W 4/00 | (2009.01) | |
| H04W 64/00 | (2009.01) | |
| H04W 84/12 | (2009.01) | |

(52) U.S. Cl.
CPC .......... *H04W 4/027* (2013.01); *H04W 4/008* (2013.01); *H04W 64/006* (2013.01); *H04W 84/12* (2013.01)

(58) Field of Classification Search
CPC ... H04W 7/027; H04W 4/008; H04W 64/006; H04W 84/12; B60C 23/066; B60R 21/0134; B60R 21/01554; B60R 21/01546; B60R 21/01536; G01S 5/0273; G01S 5/08; G01S 15/04; G01S 15/42; B60N 2/002; G06K 9/00362
USPC ............ 455/456.2, 456.6; 701/300; 342/118, 342/432
See application file for complete search history.

(56) References Cited

U.S. PATENT DOCUMENTS

| | | | |
|---|---|---|---|
| 6,452,870 B1 * | 9/2002 | Breed ................... | G01S 15/04 367/96 |
| 7,729,742 B2 * | 6/2010 | Govari ................ | A61B 5/0031 600/109 |
| 7,925,730 B1 * | 4/2011 | Gotsman ................ | H04L 67/18 709/223 |
| 2003/0230880 A1 * | 12/2003 | Yasui ................ | B60R 21/01534 280/735 |
| 2007/0055446 A1 * | 3/2007 | Schiffmann ........... | G01S 7/4026 701/301 |
| 2009/0002147 A1 * | 1/2009 | Bloebaum ........... | H04M 1/6075 340/466 |
| 2013/0002489 A1 * | 1/2013 | Erad ........................ | G01S 3/20 342/432 |

(Continued)

FOREIGN PATENT DOCUMENTS

| | | | | |
|---|---|---|---|---|
| KR | 20130009766 A | * | 1/2013 | .......... G05D 1/0261 |
| KR | 20130122253 A | * | 11/2013 | |
| WO | WO 2013009392 A1 | * | 1/2013 | ............. B60N 2/002 |

*Primary Examiner* — Mahendra Patel

(57) ABSTRACT

Disclosed are systems and methods for identifying a user of a smart object inside a moving vehicle and as well as automatic detection and calculation of a time and a location when and where the vehicle has been parked. The systems and methods are capable to enable the identification of the user of an object inside a moving entity based on the orientation of the object to be localized as well as the movement direction of the moving entity.

9 Claims, 12 Drawing Sheets

(56) References Cited

U.S. PATENT DOCUMENTS

| | | | |
|---|---|---|---|
| 2013/0268185 A1* | 10/2013 | Rabbath | G05D 1/021 701/300 |
| 2014/0247280 A1* | 9/2014 | Nicholas | G06F 3/011 345/633 |
| 2015/0133173 A1* | 5/2015 | Edge | G01S 1/66 455/456.6 |
| 2016/0191159 A1* | 6/2016 | Aoyama | H04B 10/116 398/172 |
| 2016/0274215 A1* | 9/2016 | Edge | G01S 1/66 |

* cited by examiner

METHODS AND SYSTEMS FOR IDENTIFYING THE USER OF A SMARTPHONE INSIDE A MOVING VEHICLE AND AUTOMATIC DETECTION AND CALCULATION OF THE TIME AND LOCATION WHEN AND WHERE A VEHICLE HAS BEEN PARKED

CROSS-REFERENCE TO RELATED APPLICATION

This non-provisional patent application claims priorities from the U.S. provisional patent application Ser. Nos. 62/167,299 and 62/167,303 filed on May 28, 2015, and 62/275,781 filed on Jan. 7, 2016, the content of which are incorporated herein by reference.

FIELD OF THE INVENTION

The present invention relates generally to indoor localization of a targeted smart object, and more, specifically to systems and methods for identifying the user of a smartphone inside a moving vehicle and also automatic detection and calculation of the time and location when and where the vehicle has been parked in a secure, efficient and user friendly manner.

BACKGROUND OF THE INVENTION

The smartphone became an important and indispensable part of our daily life, and its usage has been extended to a large number of applications that covers each and every need of our life. Although the smartphone has many benefits to our society, it has also some negative impacts such as driver destruction. The usage of the smartphone by the driver while driving either for call conversations, texting or just web navigation is extremely dangerous as a large number of road accidents are caused by the driver being distracted by its smartphone.

To overcome with this negative side of the technology (smartphone), many solutions have been introduced to the market to mainly disable the smartphone while driving. The simplest solutions rely on the driving speed to look the smartphone i.e. if the smartphone knows that it is moving faster than a defined maximum speed e.g. by using the embedded GPS, it lock the smartphone and disable all the possible destruction functionalities on the smartphone. If the smartphone is used by a passenger and not a driver it should not be unlocked, but the simple solution which is purely based on the movement speed does unfortunately not distinguish whether the smartphone is used by the driver or just a passenger.

To distinguish the driver user from the passenger user, in-vehicle localization has been introduced in some solutions. Such in-vehicle localization solutions use external extra solutions such as Bluetooth or sound emitters to be installed inside the vehicles. These in-vehicles localization solutions provide a localization of the smartphone inside the vehicle but with a level of accuracy which is not enough to distinguish the driver from the passenger when the smartphone is physically located on or near the borders between the driver area and the passengers area.

Further, localization and route guidance are an important part of many applications that are used in a daily basis. There are mainly two categories of localization technologies. The first category includes satellite-based systems like GPS and which can be used in outdoor areas that are under the coverage of the related satellites. The second category includes proximity and short-range wireless or light sensing technologies that are often used to enable localization inside indoor environment where the first category cannot be used due to the unavailability of the satellite coverage. The first category above relies on pre-deployed satellites that provide coverage through large areas around the globe, and these satellites are already deployed and can be used from anywhere as long as they are seen from the target area. Unfortunately the satellite-based localization systems cannot be used to enable indoor localization, and here the second category above comes to overcome and enable indoor-localization. These second category systems provide accurate localization as long as the target system is fine-tuned in advance to a system (set of sensors) pre-installed in the target area. Therefore, the second category fails when it comes to non-pre-equipped indoor areas.

Remembering or figuring out the parking location of the vehicle, for example the car, is not always easy especially when the size of the related parking lot or area is big or unfamiliar. It is very useful to know where a user has parked his/her vehicle, for example a car, such that the user could easily find it later on when coming back to the parking, for example when the user leaves his office after a long day at work and he does not want to spend any extra minutes just to remember or to figure out where has he parked his car.

When parking in uncovered outdoor parking lot the user might use any GPS application to record the GPS coordinates of the location where the car has been parked, and later on the user just use any navigation system to navigate back to his car's location. But unfortunately sometimes the user forgets to manually record or trigger the recording of the location of his car, and later on when he return back to the parking it would be not easy to find his car as he has not saved its parking location. Therefore, saving the parking location manually might work only and only if the user remembers to do it, but this is not always possible with human being.

Some solutions use the change in the movement profile to automatically detect the location where the car has been parked. For example, based on the movement speed, when the speed is higher than a certain threshold the system understands that the user is driving, and when the speed drops below a certain threshold the system understands that the user is walking. The location where the transition from driving to walking happened corresponds to the location where and time when the car has been parked. Such a solution cannot work in covered areas (e.g. underground parking) due to the unavailability of GPS, and where indoor localization is enabled by technologies that cannot offer the same accuracy as GPS which is needed to clearly distinguish the user movement profile (walking or driving).

Alternatively, some state of the art parking management systems provide a camera-based solution that enables the user with an interface to figure out in which zone or area of the parking lot a specific car has been parked. Such solutions work fine in both indoor and outdoor parking, but they require the installation of several cameras (i.e. at the entries and exits of each zone or area of the parking lot), which can be too costly.

Furthermore, when an incident e.g. a fire takes place in a closed indoor environment which is not already equipped with a system that enables indoor localization, the rescue team faces a real challenge to move inside that environment in an efficient and optimal way especially when the visibility is reduced for example due to dark smokes. And sometimes the rescue agents take the risk to go and move inside such strange environments with the risk that they cannot find their way back to the exit, which might end up sadly with death or serious consequences especially when the agents life depends on the amount of oxygen available inside the oxygen bottle and thus depends on the time they spend to get back to the exit.

In view of the disadvantages inherent in the conventional means of indoor localization of targeted smart objects and their users, it has remained a constant concern to provide for more practical, more efficient cost effective means to enable the identification of a targeted smart object and the user holding the targeted object inside a moving entity based on the orientation of the object to be localized as well as automatic detection and calculation of the time and location when and where the vehicle has been parked.

SUMMARY FOR THE INVENTION

In view of the foregoing disadvantages inherent in the prior art, the general purpose of the present invention is to provide an improved combination of convenience and utility to enable the identification of the user of an object inside a moving entity based on the orientation of the object to be localized as well as automatic detection and calculation of the time and location when and where the vehicle has been parked, to include advantages of the prior art and to overcome the drawbacks inherent therein.

In one aspect, the present invention provides a system for identifying at least a user of at least a smart object inside a moving vehicle. The system comprises: at least a transceiver installed inside the vehicle at a strategic location, the transceiver is capable of sensing, receiving, and transmitting signals, messages; at least the smart object capable of sensing signals coming from the transceiver and estimating signal strength and a distance based on a time of arrival of signal strength of received packets; at least a three dimensional Compass sensor adapted to determine the orientation of the smart object within the surrounding space; at least a gyroscope sensor adapted to determine a current direction of the smart object; and at least a localization module capable of comparing an orientation of the Smart object to a movement direction of the vehicle, wherein at least one of the three dimensional Compass sensor, the three dimensional Accelerometer sensor, and the localization module communicably connected with the smart object.

In another aspect the present invention provides a method for identifying a user of a smart object inside a moving vehicle. The method comprises the steps of: calculating at least a distance between at least a smart object and at least a transceiver based on a wireless signal attenuation (RSSI) or signal time arrival; checking whether a myDistance is greater than a maximum distance; identifying a an Object holder as a passenger if the myDistance is greater than the maximum distance; checking whether the myDistance is greater than the minimum distance; identifying the Object holder as a driver if the myDistance is less than the minimum distance; indicating a Doubt Area if the myDistance is greater than the minimum distance; calculating a current direction of the smart object; checking whether a current direction of the smart object is in a way a front screen of the smart object is facing the passenger; confirming the smart object holder as the passenger if the current direction of the smart object is in the way the front screen of the smart object is facing the passenger; and confirming the smart object holder as the driver if the current direction of the smart object is not in the way the front screen of the smart object is facing the passenger, wherein the transceiver is located in a front-left side of the moving vehicle.

In yet another aspect, the present invention provides a method for automatic detection and calculation of the time and location when and where the vehicle has been parked. The method comprises the steps of: calculating a current distance between a first object and a second object based on a RSSI as sensed by the first object of the wireless signal transmitted by the first object; checking whether a current_distance is greater than a maximum_distance, wherein the maximum_distance is a predefined threshold; calculating the current_distance between the first object and the second object if the current_distance is not greater than the maximum_distance; capturing a separation_time and a separation_location if the current_distance is greater than the maximum_distance; calculating a current distance between a first object and a second object based on a RSSI as sensed by the first object of the wireless signal transmitted by the first object; checking whether the current_distance is greater than the maximum_distance; and calculating the current_distance between the first object and the second object, wherein the first object include a transceiver and the second object include a mobile terminal.

In another aspect, the present invention provides a system for automatic detection and calculation of the time and location when and where the vehicle has been parked. The system comprises: at least a transceiver installed in a vehicle; at least a mobile terminal hold by a user, the mobile terminal is capable of continuously scan and monitor different or a specific wireless transceiver in a vicinity and then calculating the strength of the signals received from said different and specific transceiver, wherein a change in the signal strength detect that the user is still close by the vehicle or started moving away from the vehicle, wherein the change in the signal strength is used as a trigger to record and calculate a location where the vehicle has been parked.

These together with other aspects of the present invention, along with the various features of novelty that characterize the invention, are pointed out with particularity in the detailed description forming a part of this disclosure. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

While the specification concludes with claims that particularly point out and distinctly claim the present invention, it is believed that the expressly disclosed exemplary embodiments of the present invention can be well understood from the following detailed description taken in conjunction with the accompanying drawings, in which like reference numerals identify the same elements. The drawings and detailed description which follow are intended to be merely illustrative of the expressly disclosed exemplary embodiments and are not intended to limit the scope of the invention as set forth in the appended claims. In the drawings:

DETAILED DESCRIPTION OF THE INVENTION

The exemplary embodiments of the present invention, described herein detail for illustrative purposes, are subject to many variations, structure and design. It should be emphasized, however that the present invention is not limited to particular systems or methods for accurate identification of user of a smart object when being used inside a moving vehicle, and automatic detection and calculation of the time and location when and where the vehicle has been parked as shown and described. On the contrary, a person skilled in the art will appreciate that many other embodiments of the present invention are possible without deviating from the basic concept of the present invention as the principles of the present invention can be used with a variety of indoor and targeted objects localization and identification methods and structural arrangements. It is understood that various omissions, substitutions of equivalents are contemplated as circumstances may suggest or render expedient, but the present invention is intended to cover such alternatives, modifications, and equivalents as can be reasonably included within the scope of the present invention and any such work around will also fall under scope of the present invention without departing from the spirit or scope of the its claims.

In the following description, for purposes of explanation, numerous specific details are set forth in order to provide a thorough understanding of the present invention. It will be apparent, however, to one skilled in the art that the present invention may be practiced without these specific details.

As used herein, the term 'plurality' refers to the presence of more than one of the referenced item and the terms 'a', 'an', and 'at least' do not denote a limitation of quantity, but rather denote the presence of at least one of the referenced item. The term 'system' also includes 'machine', 'device', and 'apparatus'.

According to an exemplary embodiment, the present invention provides more practical and more efficient cost effective means to enable the identification of a targeted smart object and the user holding the targeted object inside a moving entity based on the orientation of the object to be localized as well as the movement direction of the moving entity and also automatic detection and calculation of the time and location when and where the vehicle has been parked.

Figure 1:
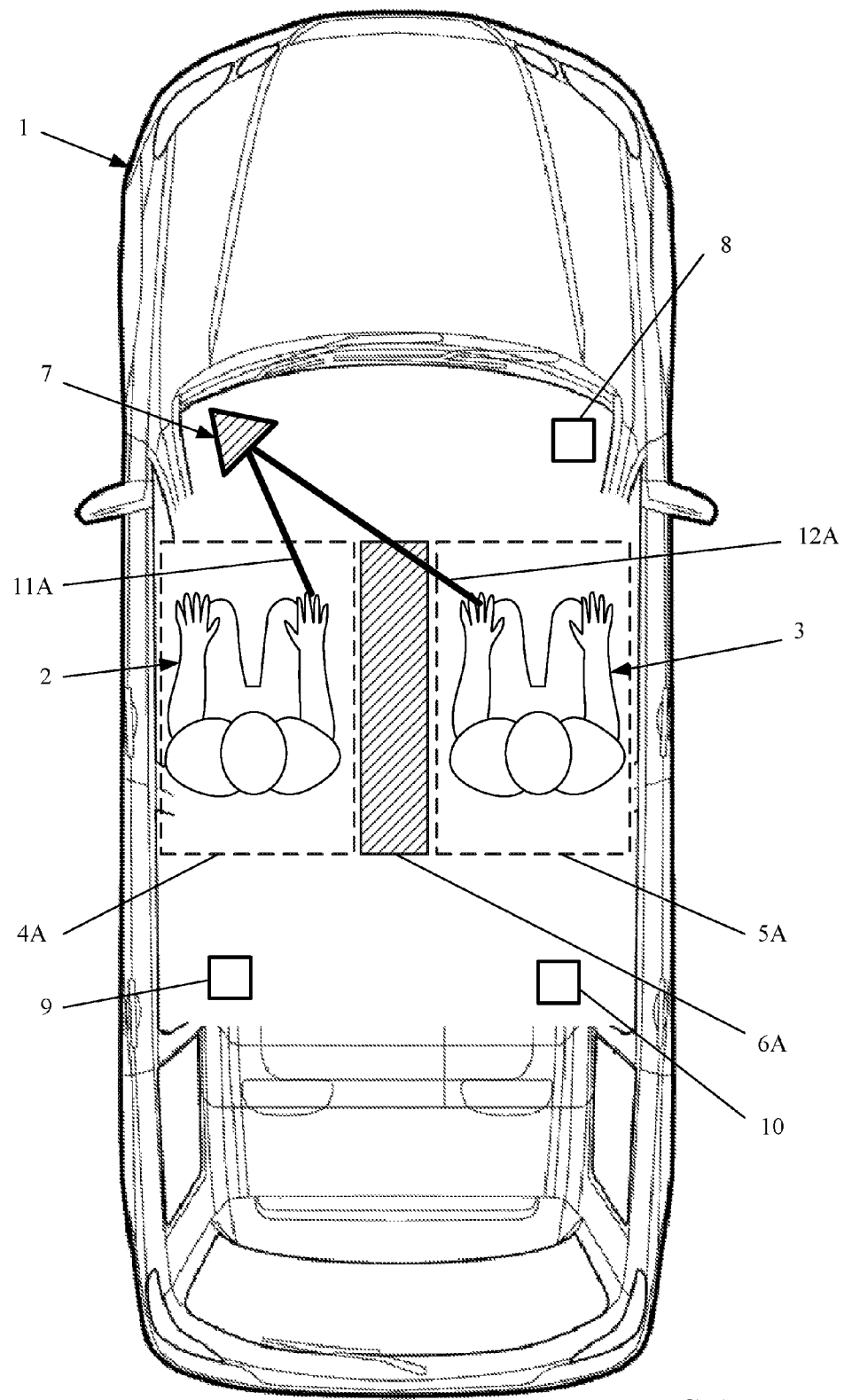
FIG. 1 illustrates areas around a driver and a passenger in a moving vehicle.

Referring to FIG. 1 which illustrates a vehicle 1 with a driver 2, a passenger 3, a Distracting Area 4A around the driver 2, a Safe Area 5A around the passenger 3, and a Doubt Area 6A in between the Distracting Area 4A and the Safe Area 5A. The Distracting Area 4A represents the space surrounding the driver 1 and the Safe Area 5A represents the space surrounding the passenger 2. The Doubt Area 6A is a smaller area between the Distracting Area 4A and the Safe Area 5A and represents a space surrounding a border between the driver 1 and the passenger 3.

Figure 2:
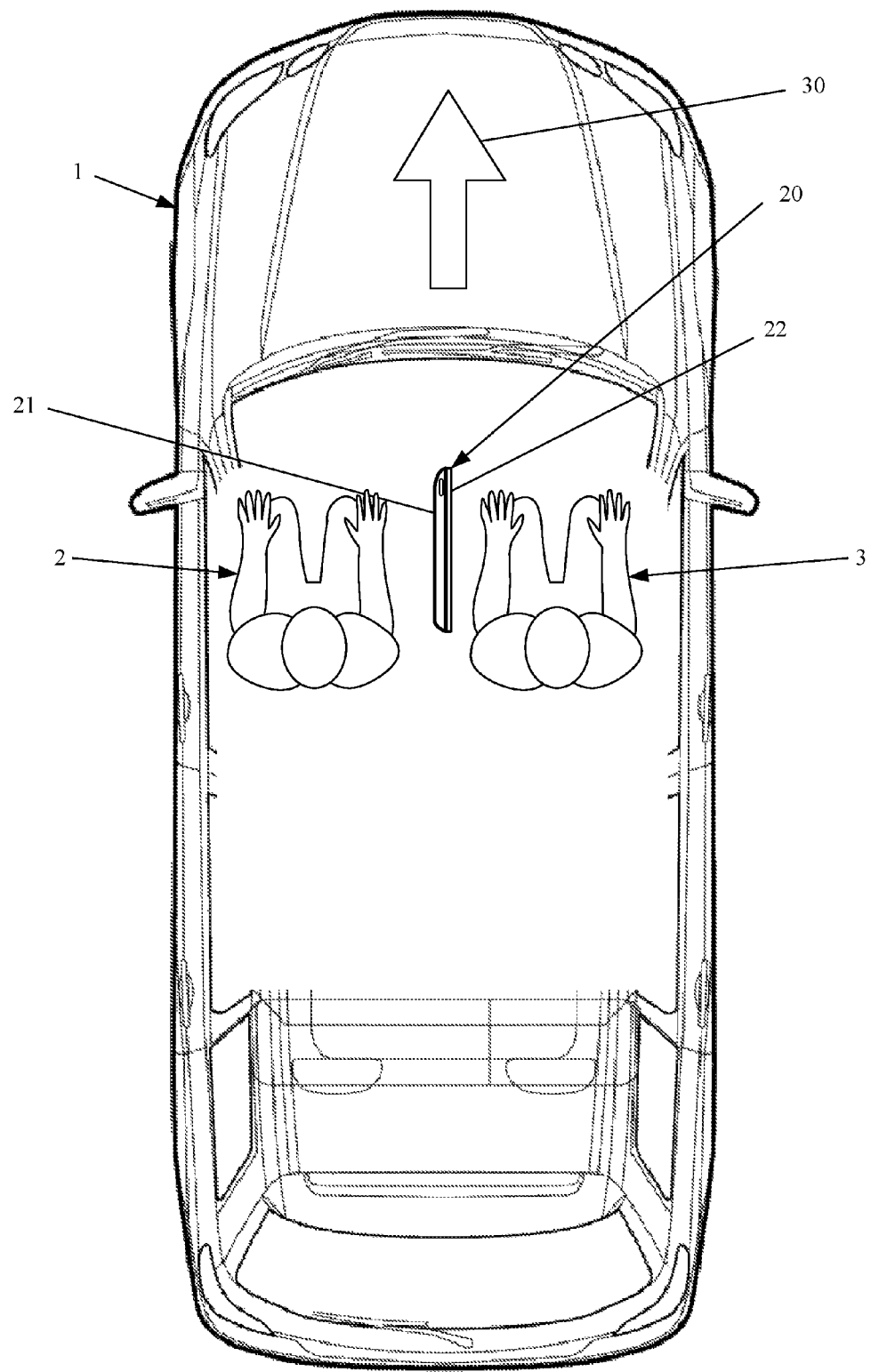
FIG. 2 illustrates the moving vehicle wherein the smart object being used by the passenger.

A smart object 20 (as shown in FIG. 2) may be easily localized in the Distracting Area 4A and the Safe Area 5A by the conventional technologies. However the localization of the smart object 20 in the Doubt Area 6A is possible by the present invention as the conventional technologies fail to teach or suggest any means for accurate localization or identification of the smart object 20 in the Doubt Area 6A.

It is relatively easy to estimate whether the smart object 20 is located in the Distracting Area 4A or in the Safe Area 6A by using traditional in-vehicle localization systems, for example by relying on wireless or sound transmitters installed inside the vehicle and then based on signal or sound arrival time or signal strength, the distance to each sensor is estimated and then an estimation of the localization of the smart object 20 is given.

Referring again to FIG. 1, a device 7 can be either a wireless or a sound transmitter (also referred to as 'wireless communication transceiver' or 'transceiver') installed inside the vehicle 1, at a strategic location. The transceiver 7 may includes a sensor may be configured for sensing, receiving, and transmitting signals or data of the smart object 20. The vehicle 1 preferably a car, however the vehicle 1 may also include other types of vehicles having a passenger seat very near to at least one of the Distracting Area 4A and the Doubt Area 6A such that accurate localization of the smart phone 20 of the passenger 2 may be necessary. Now, if the smart object 20 is equipped with a sound receiver (e.g. microphone) or a wireless receiver (e.g. Bluetooth or Wi-Fi), it may hear (receive) the transmissions coming from the transceiver 7 and estimate a distance based on the time of arrival or signal strength of received packets/frames. If the smart object 20 is hold by the passenger 2 inside the Safe Area 5A, then the distance of the smart object 20 to the transceiver 7 is a safe distance 12A, and if the smart object 20 is hold by the driver 2 inside the Distracting Area 4A, then the distance of the smart object 20 to the transceiver 7 is Distracting Distance 11A. Those distances, i.e., the safe distance 12A and the distracting distance 11A, are not always accurate and they have to be quite different to be able to distinguish the location of the smart object 20 is either in the Distraction Area 4A or in the Safe Area 5A.

Accuracy of the localization may be improved by installing the same transceiver 7 or a plurality of transceiver 7 (wireless or sound transmitters) inside the vehicle 1 at a different locations. For example, extra transceivers 7 (sensors) may be installed in different locations 8, 9 and 10 of the vehicle 1. Further, the same transceiver 7 may also be installed in any of the locations 8, 9 and 10 of the vehicle 1.

If the Smart object 20 is physically located inside the Doubt Area 6, the distance of the smart object 20 to the transceiver 7 may not be enough different from the distracting distance 11 and the safe distance 12, as such the smart object 20 may be hold by or belongs to either the Driver 2 or the Passenger 3.

Now referring to FIG. 2 which illustrates the vehicle 1 having the driver 2 and the passenger 3, wherein the smart object 20 being used by the passenger 3. By using the in-vehicle localization system and methods of the present invention, the smart object 20 may be localized somewhere between the driver 2 and the passenger 3 i.e. inside the Doubt Area 6. The present invention is capable of identifying an exact user of the smart object 20 (either the driver 2 or the passenger 3) when being localized inside the Doubt Area 6 based on the orientation of the smart object 20. The smart object 20 is shown from its top-view and it has two sides: a back side 21 and a front side 22 which is also a screen side. The smart object 20 as shown in FIG. 2 having a front side 22 facing the passenger 3 which means that the smart object is most probably used by the passenger 3 and not by the driver 2.

Figure 3:
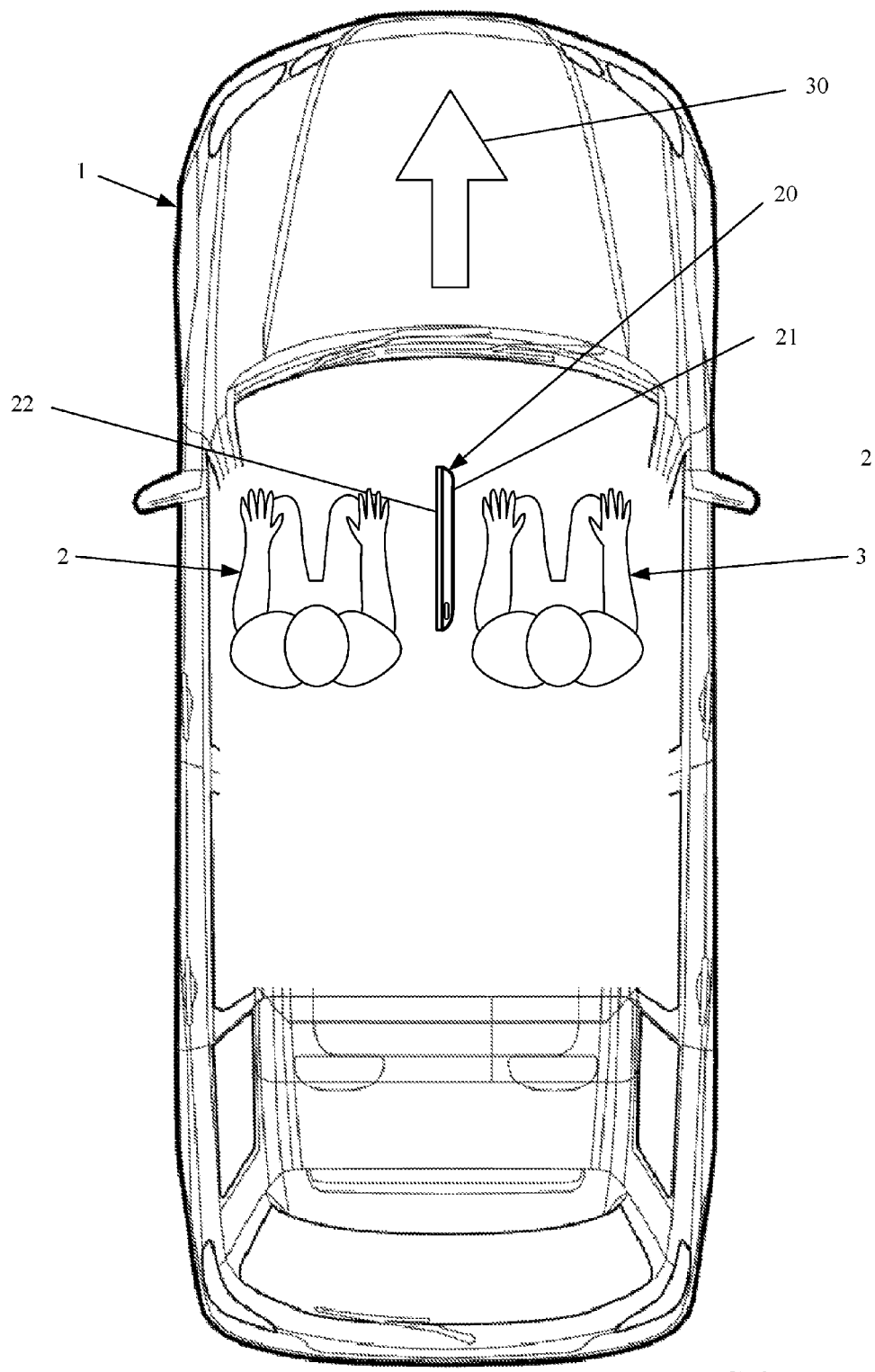
FIG. 3 illustrates the moving vehicle wherein the smart object being used by the driver.

Referring to FIG. 3 which illustrates the vehicle 1 wherein the smart object 20 being used by the driver 2. As shown in FIG. 3, the smart object 20 is now in different orientation such the front side 22 facing the driver 2 which means that it is most probably used by the driver 2 and not by the passenger 3. Based on the orientation of the smart object 20, the system 100 of the present invention, may locate and/or identify either the smart object 20 is at the driver 1 side or at the passenger 2 side.

Figure 4:
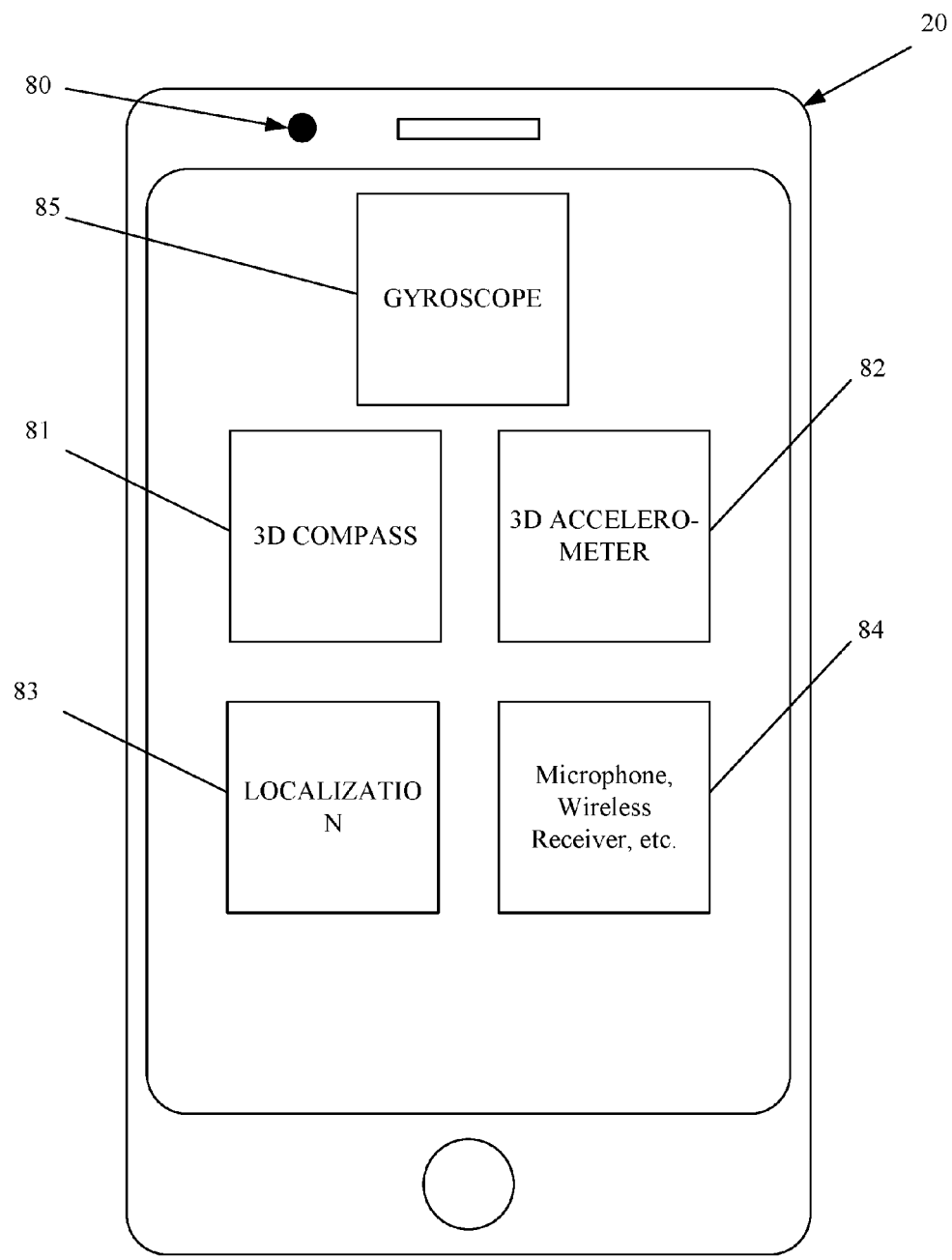
FIG. 4 illustrates a smart phone incorporating different sensing technologies, according to an exemplary embodiment of the present invention.

To know the orientation of the smart object 20 relatively to a movement direction 30 of the vehicle 1 the present invention proposes to rely on different sensors already available in most smart objects 20 (as shown in FIG. 4). The existing technologies such as wireless-based or sound-based solutions can be used to localize the smart object 20 inside the vehicle 1, but these technologies might fail when the smart object 20 is actually located on the borders between different areas and thus not easy to figure out who is holding the smart object 20 inside the vehicle, is it the driver 2 or the passenger 3.

Referring to FIG. 4 which illustrates the smart object 20 equipped with different sensing technologies that can detect the orientation of the smart object 20 within a defined space and relatively to a certain movement direction. Conventionally, a microphone or radio wireless receivers can be used to provide a localization of the smart object 20 inside the moving vehicle 1, however, such means fail to provide accurate localization of the smart object 20 in the moving vehicle 1. The present invention is capable of using other embedded sensors to fix the lack of accuracy issue. A three dimensional (3D) Compass sensor 81 can be used to determine the orientation of the smart object 20 within the surrounding space. At least a Gyroscope sensor 85 adapted to determine a current direction of the smart object 20. A three dimensional Accelerometer sensor 82 can be used to improve the calculation of the orientation of the smart object 20. The orientation of the Smart object may be compared to the movement direction (i.e. the driving direction of the vehicle 1 in which the smart object 20 is used) and to do that the localization module 83 can be used. The localization module 83 can work based on GPS and any other satellite localization system or on any other localization systems that can provide the movement direction of the smart object 20. Further a plurality of other types of sensors including a Luminosity sensor, a Gyroscope sensor may also be used for accurate localization of the smart object 20.

Figure 5:
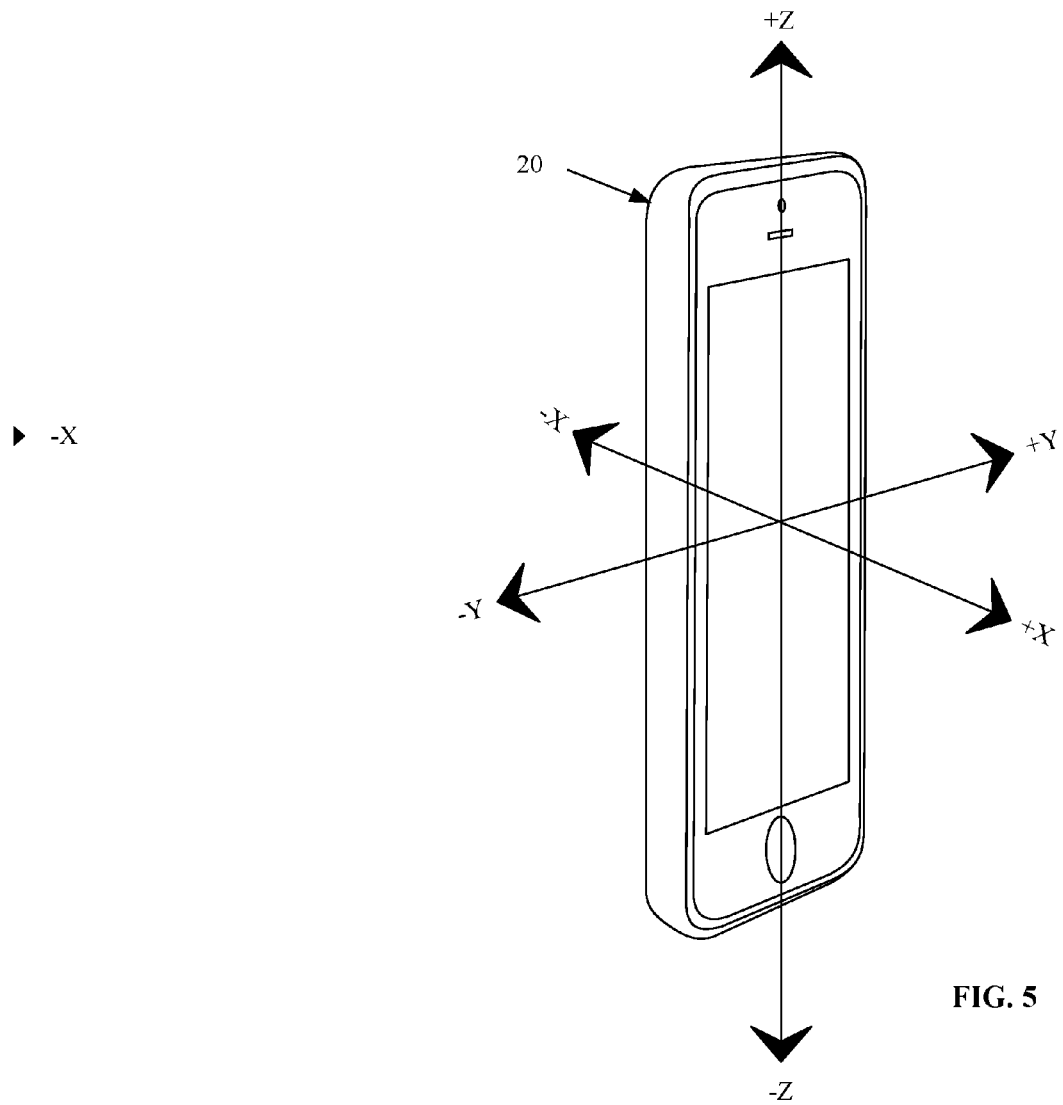
FIG. 5 illustrates a three dimensional (3D) orientation axis of the smart object with three axis (−X,+X), (−Y,+Y) and (−Z,+Z), according to an exemplary embodiment of the present invention.

Referring to FIG. 5 which illustrates a 3D orientation axis of the smart object 20 with 3 axis X (−X,+X), Y (−Y,+Y) and Z (−Z,+Z), and each axis X, Y and Z may represent the orientation of each face of the smart object 20 within the space compared to a 3D Compass and a 3D accelerometer, according to an exemplary embodiment of the present invention. After the orientation of the smart object 20 is calculated, each face of the smart object 20 is known where each axis X, Y and Z tells the orientation of each side of the phone within the surrounding space.

Figure 6:
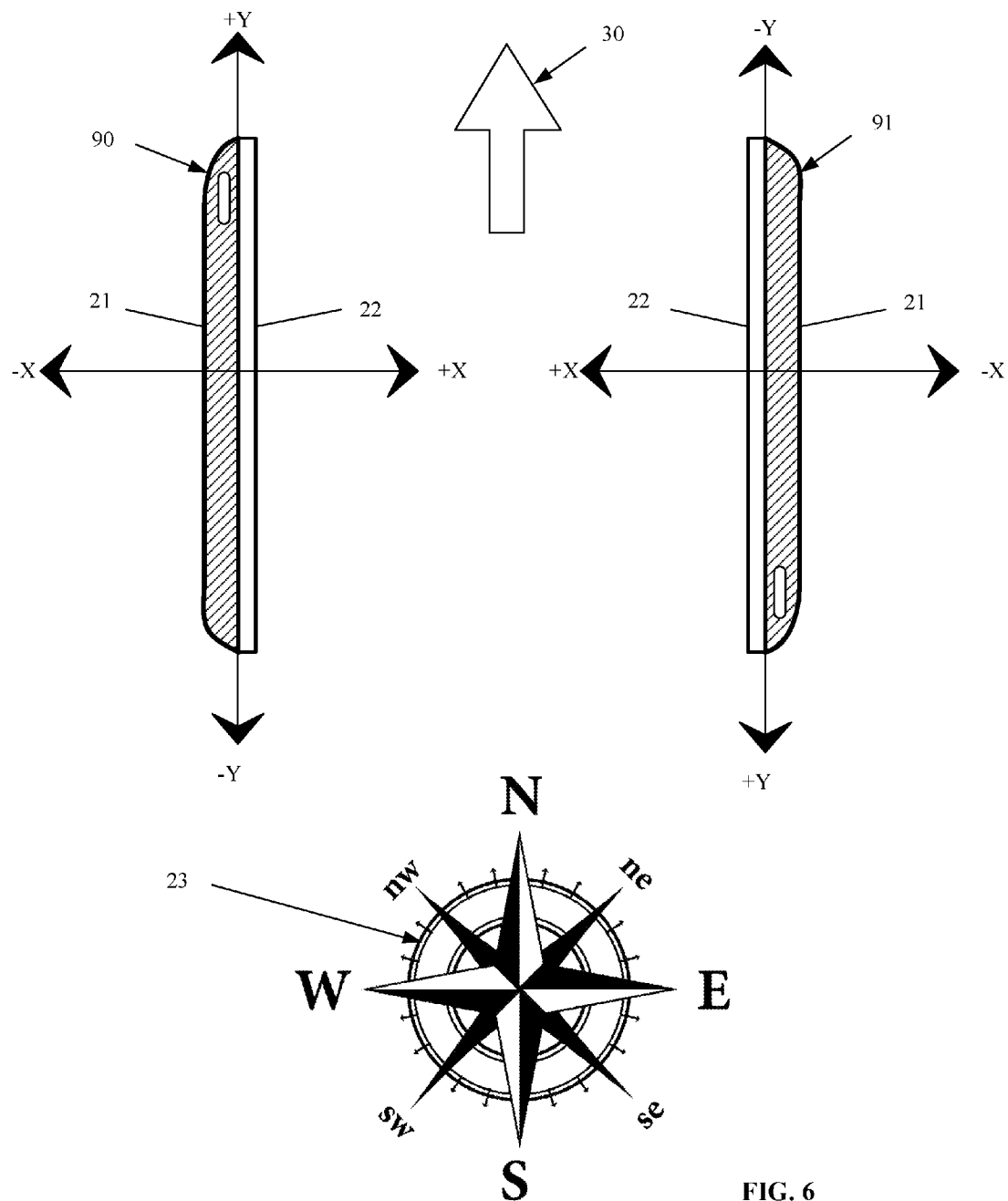
FIG. 6 illustrates a top view of the smart object being in two orientations compared to the vehicle's driving direction, according to an exemplary embodiment of the present invention.

Now referring to FIG. 6 which illustrates a top view of the smart object 20 being in two opposite orientations 90 and 91 compared to the driving direction of the vehicle 1 which is in towards the North direction as per compass 23, according to an exemplary embodiment of the present invention. When the smart object 20 is in position 90, its orientation access Y will be in positive direction as per the North direction of the compass 23 and thus in the positive direction when compared to the direction of the vehicle 1, and therefore it is most probably hold by the passenger 3. When the smart object 20 is in a position 91, its orientation access Y will be in negative direction as per the North direction of the compass 23 and thus in the negative direction when compared to the driving direction of the vehicle 1, and therefore the smart object 20 is most probably hold by the driver 2.

Referring again the FIG. 2, the smart object 20 is supposed to be hold by the passenger 3 as a front side 22 of the smart object 20 is facing the passenger 3 and not the driver 2. But there is a risk that the smart object 20 is actually held by the driver 2 even in a way the back side 21 faces the driver 2 and hear the communication through a speaker of the smart object 20. To overcome this gape, the present invention proposes to use the light-based sensor 80 as shown in FIG. 4 or any other sensor that can tell if the phone's face side is facing and put close to the user's face and/or ear.

According to an exemplary embodiment, the present invention provides a system for identifying at least a user of at least the smart object 4 inside the moving vehicle. The system comprises: at least a transceiver 3 installed inside the vehicle 1 at a strategic location, the transceiver 3 is capable of sensing, receiving, and transmitting signals, messages; at least the smart object 3 capable of sensing signals coming from the transceiver 4 and estimating signal strength and a distance based on a time of arrival of signal strength of received packets; at least a three dimensional Compass sensor 81 adapted to determine the orientation of the smart object 3 within the surrounding space; at least a three dimensional Accelerometer sensor 82 adapted to improve a calculation of the orientation of the smart object 3; and at least a localization module 83 capable of comparing an orientation of the smart object 3 to a movement direction of the vehicle 1, wherein at least one of the three dimensional Compass sensor 81, the three dimensional Accelerometer sensor 82, and the localization module 83 communicably connected with the smart object 3.

Figure 7:
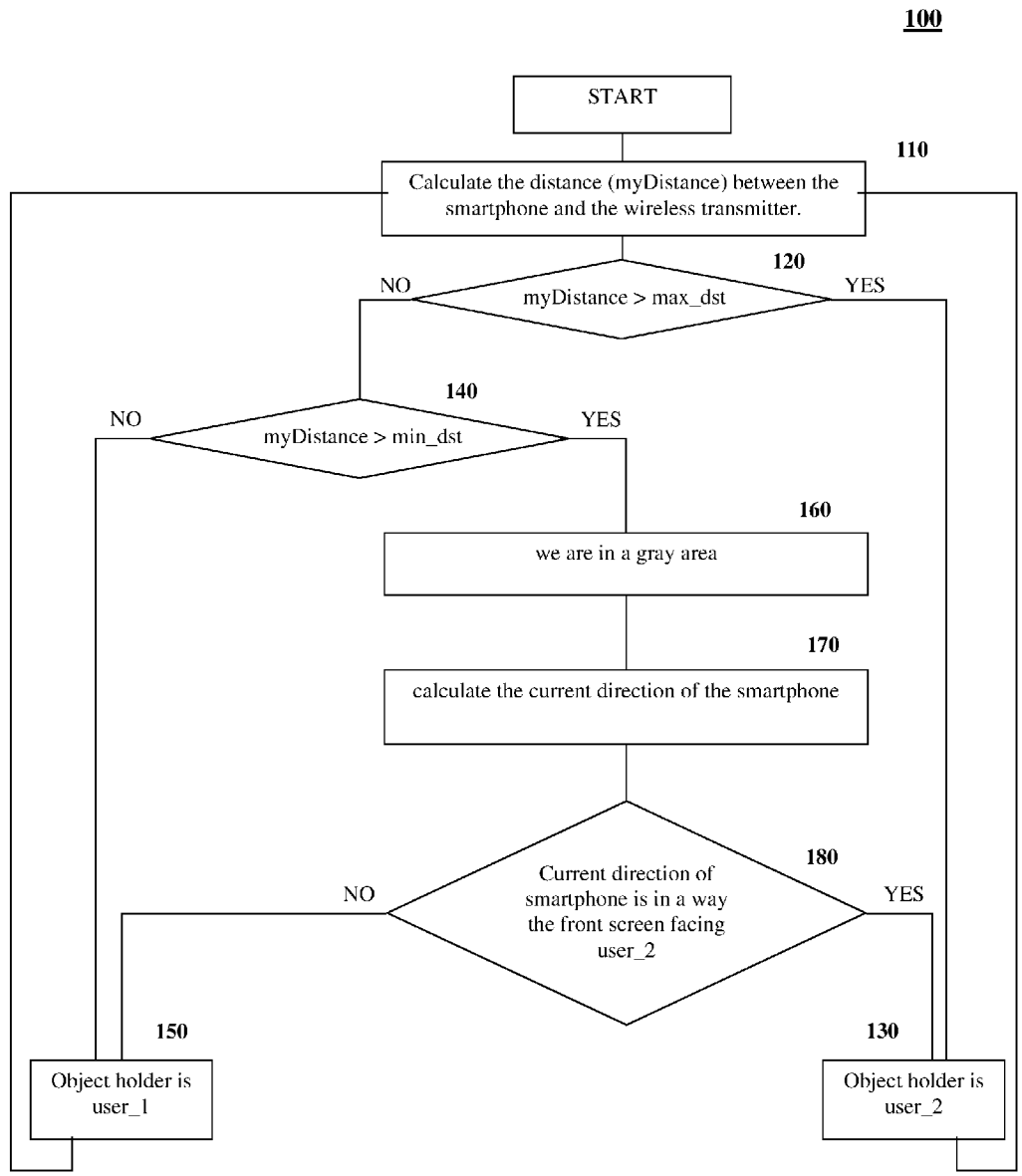
FIG. 7 is a flow graph of a method for identifying a user of a smart object inside a moving vehicle, according to an exemplary embodiment of the present invention.

Referring to FIG. 7 which is a flow graph of a method 100 for identifying a user of a smart object inside a moving vehicle, according to an exemplary embodiment of the present invention.

The method 100 starts by calculating the distance (myDistance) between the smart object 20 and the wireless communication transmitter 4 at a step 110. The distance can be calculated based on the wireless signal attenuation (RSSI) or signal time arrival.

At a step 120, the method 100 checks whether myDistance is greater than max_dst (maximum distance). If the myDistance is greater than the max_dst, the method 100 identify the Object holder as a "user_2" and redirect at the step 110. If the myDistance is less than max_dst at the step 120, then at a step 130 the method 100 checks whether the myDistance is greater than a min_dst (minimum distance). If the myDistance is not greater than the min_dst, i.e., if the myDistance is less than the min_dst, the method 100 identify the Object holder as a "user_1". The user_2 refers passenger 3 and the user_1 refers the driver 2 in FIG. 1.

If the myDistance is greater than the min_dst, the method 100 indicates as "we are in a gray area" (the Doubt Area 6A) at a step 160. At a step 170, the method calculates a current direction of the smart object 20. The current direction of the smart object 20 is calculated based on the smart object integrated compass, gyroscope, and current moving direction (degrees toward north) which can be given by GOS.

At a step 180, the method 100 checks whether a current direction of the smart object 20 is in a way the front screen 22 of the smart object 20 is facing user_2. If the check confirms YES, the object holder is user_2, i.e., the object holder is passenger 3. If the check confirms NO, the object holder is user_1, i.e., the object holder is the driver 2.

The method 100 is applicable only in the case when the wireless communication transmitter 4 is located in the front-left side as per a movement direction shown in FIG. 1.

The advantages of the present invention include, without limitation, the accurate localization of an object within a moving entity such as a vehicle. When applied to driver anti-distraction solutions that should lock the smart object 20 when being used by the driver 1 but in the same time should keep it open when being used by passengers, this invention enables an accurate system to distinguish the driver user from the passenger users. Without this invention the smart object 20 user cannot be identified (either driver 2 or passenger 3) when the smart object 20 is located in an area around the border line between the driver 2 surrounding and the passenger 3 surrounding.

The present invention provides methods and systems to enable the identification of the user of an object inside a moving entity based on the orientation of the object to be localized as well as the movement direction of the moving entity.

Now, assuming that the vehicle is equipped with a wireless transmitter, i.e., transceiver 7 in FIG. 1 (In fact, many new vehicles come with Wi-Fi, Bluetooth and/or other wireless communication technologies), and the user is equipped with a mobile terminal (e.g. Smart object) which continuously scan and monitor the different or a specific wireless transceiver in the vicinity, and then calculate the strength of the signals received from those or that transceiver. When the strength of the signal drops below a defined or calculated threshold, it means that the distance between the user's mobile terminal and the related wireless transceiver has increased, which could be due the fact that the mobile terminal (thus the user) has walked away from his vehicle (note that the related wireless transceiver is located inside the vehicle). The present invention is configured to use the above change in the signal strength to detect that the user is still close by his vehicle or started moving away from his vehicle, and this can be used as a trigger to record (or calculate later on) the location where the vehicle has been parked.

According to an exemplary embodiment, the present invention provides a system to automatically detect and/or calculate the location and time when and where an object A has been separated from another object B as long as the first object (either A or B) is equipped with a wireless communication transceiver (also referred to as 'transceiver') and the other object is equipped with the capability to sense the strength of the signal received from the transceiver in/on the first object. The time and the location when and where the strength of the received signal changes (from relatively high to a relatively low strength) is considered as the time and the location when and where the two objects have been separated.

Figure 8:
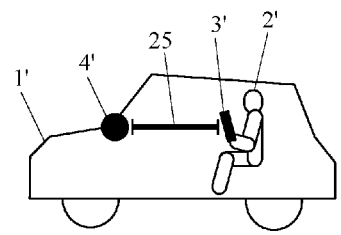
FIG. 8 illustrates a vehicle equipped with a wireless communication transceiver wherein a person sitting and holding a mobile terminal.

Referring to FIG. 8 which illustrates the vehicle 1' equipped with a transceiver 4' wherein the person 2' is sitting and holding a mobile terminal 3'. The transceiver 4, includes Wi-Fi, Bluetooth, low energy Bluetooth, low energy Wi-Fi, infrared, localization sensors and any kind of short range wireless devices that periodically transmit a message e.g. once per second that can be sniffed by a user's device to enable localization based on either proximity or signal strength or signal time arrival.

Figure 9:
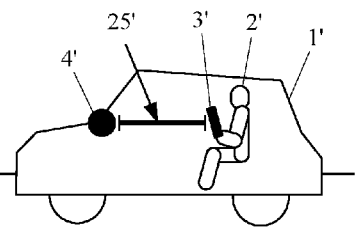
FIG. 9 illustrates the vehicle running on a road wherein the person is sitting and holding the mobile terminal.

The transceiver 4' can be originally integrated in the vehicle 1' by the automobile maker, or brought in. The mobile terminal 3' is capable of sensing the strength and the time of arrival of the wireless signal coming from the transceiver 4'. The strength of the wireless signal is higher when a terminal-transceiver distance 25 is relatively smaller, and the strength of the wireless signal is weaker when the terminal-transceiver distance 25 is relatively bigger. The time of arrival of the wireless signal is shorter when a terminal-transceiver distance 25 is relatively smaller, and the time of arrival of wireless signal is higher when the terminal-transceiver distance 25 is relatively bigger. The terminal-transceiver distance 25 represents the distance between the mobile terminal 3 and the transceiver 4'. Referring to FIG. 9 which illustrates the vehicle 1' equipped with the transceiver 4' running on a road wherein the person 2' sitting inside the vehicle 1' holding the mobile terminal 3'.

Figure 10:
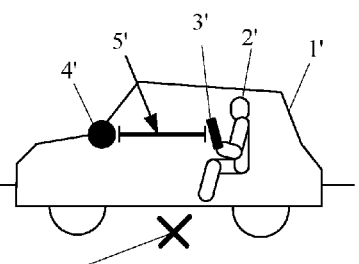
FIG. 10 illustrates the vehicle parked in a specific location and inside the vehicle the person is sitting and holding the mobile terminal.

As the vehicle 1' is running on the road, the strength of the wireless signal from the transceiver 4' as sensed by the mobile terminal 3' is relatively high and the time of arrival of the wireless signal from the wireless communication transceiver 4' as sensed by the mobile terminal 3' is relatively shorter, which means that the terminal-transceiver distance 25' is relatively small. The high signal strength and/or the shorter time of arrival and/or relatively the terminal-transceiver distance 5' indicates that the mobile terminal 3' and the person 2' holding the mobile terminal 3 are at a relatively close distance to the transceiver 4', and in other words the mobile terminal 3' and the person 2' holding the mobile terminal 3' are either inside the vehicle 1 or close by the vehicle 1'. Referring to FIG. 10 which illustrates the vehicle 1' parked in a specific location 26 and the person 2' is sitting and holding the mobile terminal 3' inside the vehicle 1'. Till the person 2' holding the mobile terminal 3' is inside the vehicle 1' which is parked at the specific location 26, the strength of the wireless signal from transceiver 4' as sensed by the mobile terminal 3' is relatively strong, meaning that the terminal-transceiver distance 25' is still relatively small.

Figure 11:
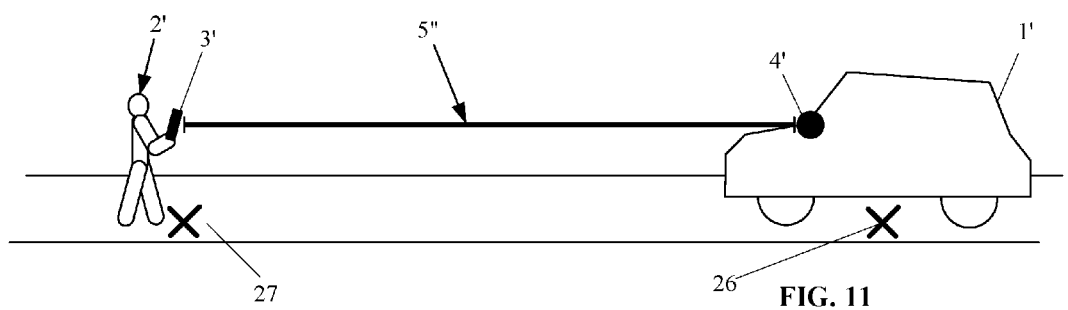
FIG. 11 illustrates the vehicle parked in the specific location and the person holding the mobile terminal standing at some distance from a parking location of the vehicle.

Now referring to FIG. 11 which illustrates the vehicle 1' parked at the specific location 26 in a parking area and the person 2' holding the mobile terminal 3' standing at a distance 25" from the specific location 26 of the vehicle 1' in the parking area.

As shown in the FIG. 10, the vehicle 1' is still parked at the specific location 26 but the person 2' has walked away from the specific location 26 of the vehicle 1' and standing at an away location 27. The mobile terminal 3' which is hold by the person 2' is now sensing a relatively weaker signal strength from the transceiver 4', and a relatively higher time of arrival of the wireless signal, which indicates that the terminal-transceiver distance 25", i.e., the distance between the mobile terminal 3' (therefore the person 2') and the transceiver 4' (therefore the vehicle 1') has been increased.

The change in the signal strength and the time of arrival of the wireless signal coming from the transceiver 4' as sensed by the mobile terminal 3' is directly linked to the change in the distance between the mobile terminal 3' and the transceiver 4'. Sensing such change in the signal strength as well as in the terminal-transceiver distance (from 25' in FIG. 3 to 25" in FIG. 4) is used in the present invention as a trigger or an indication for knowing if an user i.e., the person 2', is being close or moving away from the vehicle 1'. When the user (person 2') is detected to be walking away from his vehicle 1' (i.e. the signal strength from the wireless transceiver drops below a defined or calculated threshold), the specific location 26 or an area surrounding the specific location 26 is recorded or tagged as a source location where the user (person 2') and his vehicle 1' has been separated. The source location is also corresponds to the location or area where the vehicle 1' has been parked.

The presence of other vehicles with different transceivers around i.e., in the area surrounding the specific location 26 could create conflict with the transceiver 4'. To solve this conflict out, the mobile terminal 3' needs to identify the transceiver of interest and which is inside the vehicle 1', i.e. wireless communication transceiver 4'. To do so, i.e., to identify the transceiver 4' installed in the vehicle 1', each transceiver 4' is provided with a unique identifier, for example, the Medium Access Control (MAC) address, that can help the mobile terminal 3' to easily identify the transceiver 4', which is of interest. The mobile terminal 3' can rely not only on a manual configuration to know the identifier of the transceiver(s) of interest (that is/are installed in/on the vehicle of interest (vehicle 1')), but also on a learning-based module.

According to an exemplary embodiment of the present invention, the learning-based module uses the historical data, as the mobile terminal 3' will often sense the transceiver 4' when moving at a driving speed, i.e. the mobile terminal 3' must be hold inside the vehicle 1', and as this happens often enough, the mobile terminal 3' might conclude that the sensed transceiver 4' is also inside the vehicle 1', and must be the one installed inside the vehicle of interest and will be recorded as the wireless transceiver of interest.

Figure 12:
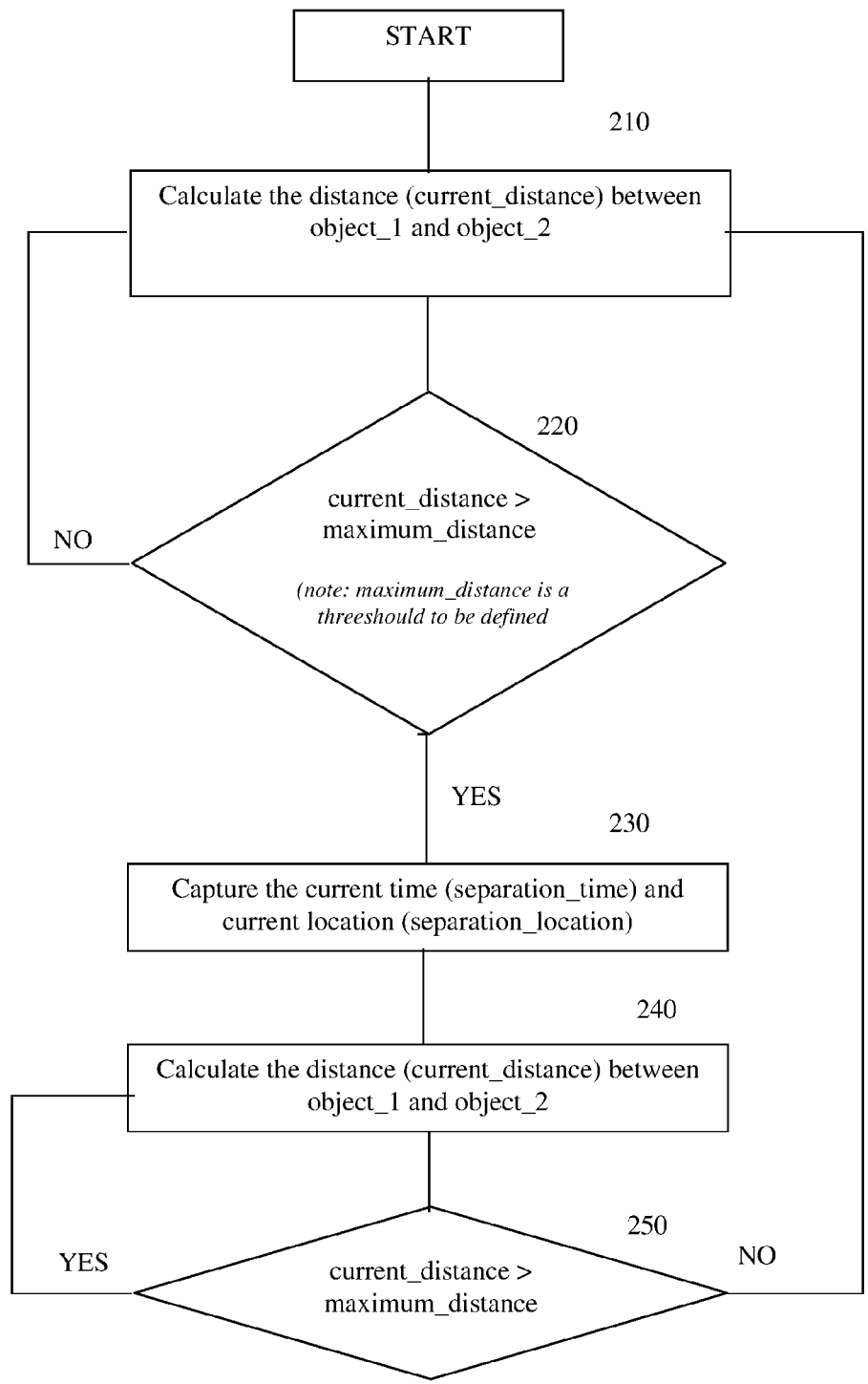
FIG. 12 is a flow graph of a method for automatic detection and calculation of the time and location when and where the vehicle has been parked.

Referring to FIG. 12 is a flow graph of a method 200 for localizing the vehicle 1' by capturing a current time (separation_time) and a current location (separation_location). At a step 210, the method 200 calculate the distance (current_distance) between an object_1 (also referred to as 'first object' or 'transceiver') and an object_2 (also referred to as 'second object' or 'mobile terminal' or 'smart object') based on the RSSI as sensed by/at the object_1 of the wireless signal transmitted by/from the object_1.

At a step 220, the method 200 checks whether a current_distance is greater than a maximum_distance, wherein the maximum_distance is a predefined threshold. If the current_distance is not greater than the maximum_distance, then the step 210 is activated and the distance (current_distance) between the object_1 and the object_2 is calculated. In case of the current_distance is greater than the maximum_distance, then a current time (separation_time) and a current location (separation_location) is captured at a step 230.

At a step 240, a distance (current_distance) between the object_1 and the object_2 is calculated based on the RSSI as sensed by/at the object_1 of the wireless signal transmitted by/from the object_1.

At a step 250, the method 200 checks whether a current_distance is greater than the maximum_distance. In case of the current_distance is not greater than a maximum_distance, the step 210 is activated to calculate the distance (current_distance) between the object_1 and the object_2.

At the step 250, if the current_distance is greater than the maximum_distance, then the step 240 is activated to calculate the distance (current_distance) between the object_1 and the object_2.

According to an exemplary embodiment, the present invention provides a system for automatic detection and calculation of the time and location when and where the vehicle 1' has been parked. The system comprises: at least a transceiver 4' installed in the vehicle 1'; at least a mobile terminal 3' hold by a user 2', the mobile terminal 3' is capable of continuously scan and monitor different or the specific wireless transceiver 4' in a vicinity and then calculating the strength of the signals received from said different and specific transceiver 4', wherein a change in the signal strength detect that the user 2' is still close by the vehicle 1' or started moving away from the vehicle 1', wherein the change in the signal strength is used as a trigger to record and calculate a location where the vehicle 1' has been parked.

The advantages of the present invention include, without limitation, to automatically calculate and/or detect the specific location and time where and when a vehicle has been parked. Without the present invention the user must manually record the location and time of his vehicle when parking it, otherwise alternatively camera-based technologies could solve the same issue, but those technologies are very expensive as they require a camera to be installed at each small area (few parking spaces) of the parking lot.

According to an exemplary embodiment, the present invention provides means of quickly deployable ad-hoc infrastructure that enables localization and route navigation inside indoor strange areas where the navigation could be difficult for different reasons including the lack of visibility which could be caused by smoke or darkness, the complexity of the related indoor area, the unfamiliarity of the user with the related indoor area. Without this invention a user cannot navigate efficiently inside an indoor area which is not pre-equipped with a technology that could enable indoor localization and navigation.

According to an exemplary embodiment, the present invention provides a method and a system to quickly enable localization and route navigation in indoor areas that are not already equipped with adequate infrastructure that could enable indoor localization and navigation. The present invention provides to place sensors on the way when moving inside a strange indoor environment to trace the taken path, and that traced path is used later on to localize and guide the user back to the exit or to any marked place in an efficient and optimal way.

Figure 13:
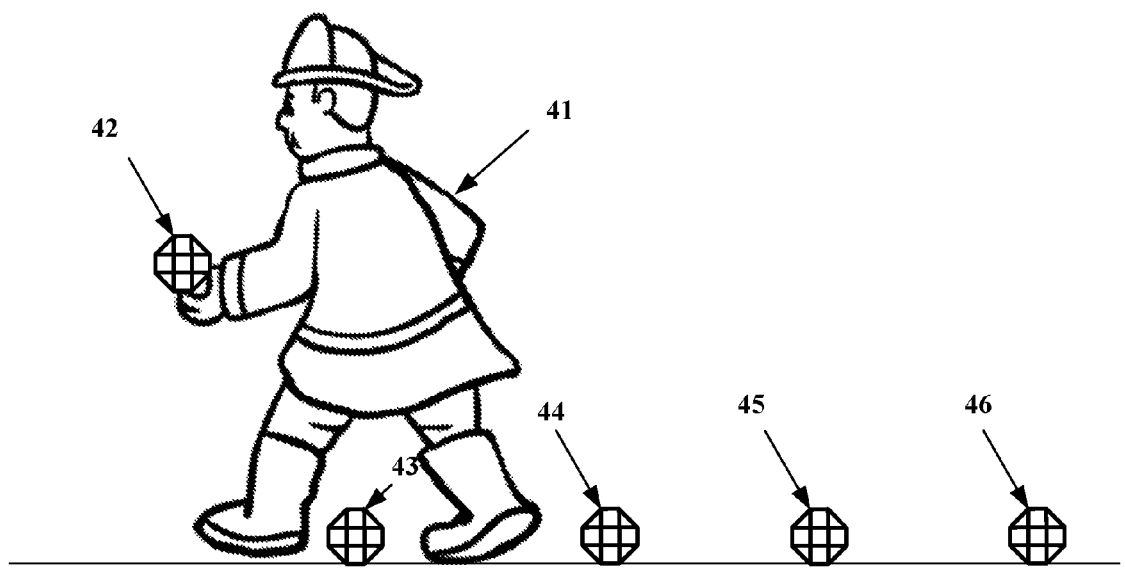
FIG. 13 illustrates a rescue agent walking inside an unfamiliar indoor area and throwing a plurality of localization sensors while walking.

Referring to FIG. 13 which illustrates the person 41 (herein after referred to as 'rescue agent') moving inside an unfamiliar indoor area and throwing a plurality of localization sensors 42, 43, 44, 45, and 46 on a floor while moving. The localization sensors 42, 43, 44, 45, and 46 can be any kind of indoor-localization sensors that include but not limited to short range wireless devices that periodically transmit a message e.g. once per second that can be sniffed by a user's device to enable localization based on either proximity or signal strength.

The localization sensors 42, 43, 44, 45, and 46 can be also stuck to a wall or any surface on the way of the rescue agent 41. The localization sensors 42, 43, 44, 45, and 46 can be thrown by an automated mechanism that releases a sensor based on the time elapsed since a previous release of a previous sensor or based on the distance elapsed from a previously released sensor.

The distance to a previously released sensor can be calculated based on the signal strength attenuation in case of using wireless-based localization sensors, or based on the sound signal attenuation in case of using sensor-based sensors. 3D compass and 3D accelerometer and Gyroscope technologies that are already integrated in many smart object could be used to evaluate the elapsed distance from the previously released sensor.

The distance elapsed since the release of the last sensor could be estimated based on the movement of the rescue agent 41 if the mobile device used by the rescue agent 41 is equipped with motion sensors that could provide information about the movement of the rescue agent 41 such as number of steps he moved.

Figure 14:
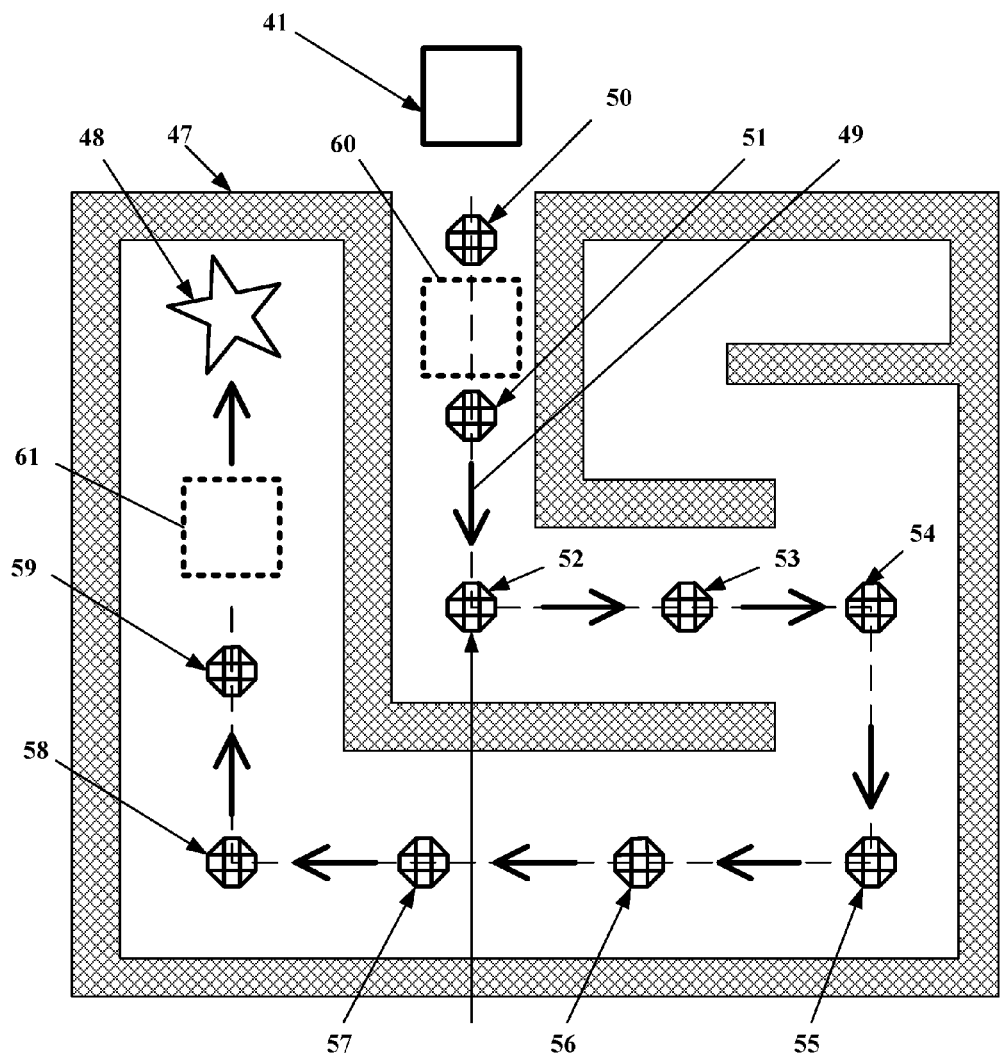
FIG. 14 illustrates a top-view of an indoor area wherein the rescue agent has to walk in to reach a target location wherein the plurality of localization sensors thrown on the way to the target location.

Referring to FIG. 14 which illustrates a top-view of an indoor area 37 wherein the same rescue agent 32 has to walk in to reach a target location 8 wherein the plurality of localization sensors 32, 33, 34, 35, and 36 thrown on the way to the target location 8. The rescue agent 41 standing next to its entrance and which has to move inside the indoor area 47 to reach the target location 48, for example a victim 48 that needs to be rescued. To do that the rescue agent 41 will follow the arrows 49 till reaching the location 61. When moving inside the indoor area 47, the rescue agent 41 throws on the floor on his way the localization sensors 50, 51, 52, 53, . . . 59, after every defined distance of walk. Just at the entrance, the rescue agent 41 throws on the floor the sensor 50 then continues walking inside the indoor area 47. When reaching the location 60, the rescue agent 41 troughs on the floor the sensor 51, and then as long as he walks inside the indoor area 47 towards the location 61 and following the arrows 49, the rescue agent 41 troughs the sensors 52, 53, 54, 55, 56, 57, 58 and 59.

Figure 15:
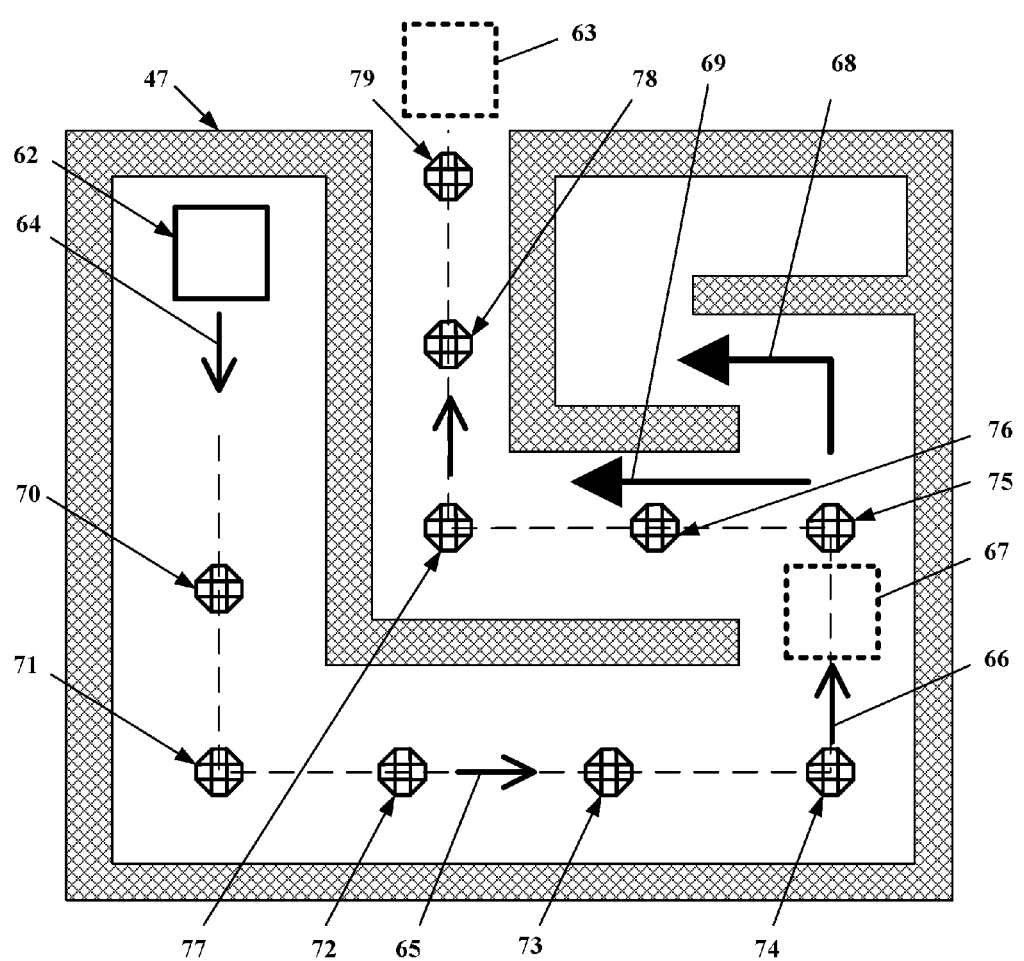
FIG. 15 is a top-view of an indoor area wherein the rescue agent located and has to walk toward the exit by following a reverse path.

Referring to FIG. 15 which is a top-view of an indoor area 47 wherein the rescue agent 41 is located and has to walk toward the exit by following a reverse path of the path the rescue agent 41 has taken to get at his current location. The same rescue agent 41 standing at a location 62 and which has to move outside the strange area and reach the location 63. To do so, the rescue agent 41 will follow the arrows 64 then 65 then 66 till reaching location 67. To be able to follow the arrows 64, 65 and 66 which represent the reverse path to get out of the strange indoor area, the rescue agent 41 will be using a portable device that could hear (sniff) the wireless or sonar transitions from the deployed localization sensors 70 to 79. The portable device could guide the rescue agent towards the first localization sensor 70, then towards the next localization sensor 73, then towards the next localization sensor 74, then towards the next localization sensor 75, then towards the next localization sensor 74 until he reaches the location 67. In case the visibility in the indoor area is reduced or impossible (e.g. due to lack or light or due to fire smoke) portable device could enable an innovative Human Machine Interface (HMI) that provides turn-by-turn instructions. Possible HMIs include but not limited to voice-enabled instructions, augmented reality instructions, and graphical interface on a flat screen on the portable device that shows the route to follow to reach the target (e.g. the exit).

In case the used localization sensors are based on wireless technology (e.g. Bluetooth Low Energy) the portable device in the hands of the rescue agent 41 will localize itself based on the signals received from the deployed localization sensors. Different indoor localization technologies could be potentially used to do that, such as triangulation and trilateration techniques.

Still referring to FIG. 15, when the rescue agent 41 reaches the location 67 he faces a junction with two possible paths 68 and 69. To reach the location 63 at the exit quickly and efficiently when being at location 67 then the rescue agent 62 has to follow the path 69 and not the path 68. Following the path 68 will cause a delay in getting the rescue agent 62 out of the indoor area 47, which could cause disasters in some applications like rescue intervention inside an indoor area in which a considerable fire is taking place. The localization sensors 75, then 76, then 77, then 78, then 79 will guide the rescue agent respectively towards the exit and let him avoid following the wrong path 68.

The solution is designed but not limited to rescue agents 41 to enable for them an accurate system for localization and route guidance in non-pre-equipped indoor environments.

In various exemplary embodiments of the present invention, the operations discussed herein, e.g., with reference to FIGS. 1 to 15, may be implemented through computing devices such as hardware, software, firmware, or combinations thereof, which may be provided as a computer program product, e.g., including a machine-readable or computer-readable medium having stored thereon instructions or software procedures used to program a computer to perform a process discussed herein. The machine-readable medium may include a storage device. In other instances, well-known methods, procedures, components, and circuits have not been described herein so as not to obscure the particular embodiments of the present invention. Further, various aspects of embodiments of the present invention may be performed using various means, such as integrated semi-conductor circuits, computer-readable instructions organized into one or more programs, or some combination of hardware and software.

Although particular exemplary embodiments of the present invention has been disclosed in detail for illustrative purposes, it will be recognized to those skilled in the art that variations or modifications of the disclosed invention, including the rearrangement in the configurations of the parts, changes in sizes and dimensions, variances in terms of shape may be possible. Accordingly, the invention is intended to embrace all such alternatives, modifications and variations as may fall within the spirit and scope of the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is understood that various omissions, substitutions of equivalents are contemplated as circumstance may suggest or render expedient, but is intended to cover the application or implementation without departing from the spirit or scope of the claims of the present invention.

We claim:

1. A system for identifying at least a user of at least a smart object inside a moving vehicle, comprising:
   at least a transceiver installed inside the vehicle at a strategic location, the transceiver is capable of sensing, receiving, and transmitting signals, messages;
   at least the smart object capable of sensing signals coming from the transceiver and estimating signal strength and a distance based on a time of arrival of signal strength of received packets;
   at least a three dimensional Compass sensor adapted to determine the orientation of the smart object within the surrounding space;
   at least a gyroscope sensor adapted to determine a current direction of the smart object;
   at least a three dimensional Accelerometer sensor adapted to improve a calculation of the orientation of the smart object; and
   at least a localization module capable of comparing an orientation of the Smart object to a movement direction of the vehicle,
   wherein an identification of an exact user of the smart object inside the vehicle including in a Doubt Area is carried out based on an orientation of the smart object relative to a movement direction of the vehicle,
   wherein the orientation of the Smart object is compared to a movement direction of the vehicle in which the smart object is used,
   wherein a light-based sensor is adapted to identify whether the smart object is stuck to a ear of the user.

2. The system of claim 1, wherein the smart object includes a smart phone, a wireless communication device equipped with a sound receiver, a wireless receiver, Bluetooth, Wi-Fi.

3. The system of claim 1, wherein the transceiver includes a wireless transmitter, a sound transmitter, a sensor, a Wi-Fi, a Bluetooth, a low energy Bluetooth, a low energy Wi-Fi, an infrared, a localization sensor and any kind of short range wireless device capable of periodically sensing, receiving, and transmitting signals, messages.

4. The system of claim 1, wherein a plurality of transceivers are installed inside the vehicle at different strategic locations for accurate localization of the smart object.

5. The system of claim 1, wherein the localization module capable of working based on a localization system which includes GPS and any other satellite localization system capable of providing the movement direction of the smart object.

6. The system of claim 1, wherein at least one of the three dimensional Compass sensor, the three dimensional Accelerometer sensor, and the localization module communicably connected with the smart object.

7. A method for identifying a user of a smart object inside a moving vehicle, comprising the steps of:
   calculating at least a distance between at least a smart object and at least a transceiver based on a wireless signal attenuation (RSSI) or signal time arrival;
   checking whether a myDistance is greater than a maximum distance;
   identifying an Object holder as a passenger if the myDistance is greater than the maximum distance;
   checking whether the myDistance is greater than the minimum distance;
   identifying the Object holder as a driver if the myDistance is less than the minimum distance;
   indicating a Doubt Area if the myDistance is greater than the minimum distance;
   calculating a current direction of the smart object;
   checking whether a current direction of the smart object is in a way a front screen of the smart object is facing the passenger;
   confirming the smart object holder as the passenger if the current direction of the smart object is in the way the front screen of the smart object is facing the passenger; and
   confirming the smart object holder as the driver if the current direction of the smart object is not in the way the front screen of the smart object is facing the passenger,
   wherein the transceiver is located in a front-left side of the moving vehicle,
   wherein an identification of an exact user of the smart object inside the vehicle including in a Doubt Area is carried out based on an orientation of the smart object relative to a movement direction of the vehicle,
   wherein the orientation of the Smart object is compared to a movement direction of the vehicle in which the smart object is used,
   wherein a light-based sensor is adapted to identify whether the smart object is stuck to a ear of the user.

8. The method of claim 7, wherein the Doubt Area lies in between a Distracting Area and a Safe Area, wherein the Doubt Area is smaller than the Distracting Area and the Safe Area.

9. The method of claim 8, wherein the Distracting Area represents a space surrounding the driver and the Safe Area represents the space surrounding the passenger.

* * * * *